United States Patent
Kalb et al.

(10) Patent No.: US 12,081,101 B2
(45) Date of Patent: Sep. 3, 2024

(54) METHOD AND DEVICE FOR DYNAMICALLY BALANCING A ROTATIONAL BODY OR A MOTOR HOUSING

(71) Applicant: Brose Fahrzeugteile SE & Co. Kommanditgesellschaft, Wuerzburg, Wuerzburg (DE)

(72) Inventors: Roland Kalb, Rossach (DE); Helmut Pfalzgraf, Eibelstadt (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 366 days.

(21) Appl. No.: 17/533,780

(22) Filed: Nov. 23, 2021

(65) Prior Publication Data
US 2022/0085690 A1   Mar. 17, 2022

Related U.S. Application Data

(63) Continuation of application No. PCT/EP2020/064619, filed on May 27, 2020.

(30) Foreign Application Priority Data

May 29, 2019   (DE) ............... 10 2019 207 940.7

(51) Int. Cl.
*H02K 7/04* (2006.01)
*B23K 26/21* (2014.01)
*B23K 26/36* (2014.01)
*B23K 101/00* (2006.01)
*G01M 1/16* (2006.01)
(Continued)

(52) U.S. Cl.
CPC ............... *H02K 7/04* (2013.01); *G01M 1/16* (2013.01); *G01M 1/32* (2013.01); *G01M 1/34* (2013.01); *H02K 5/24* (2013.01); *B23K 26/21* (2015.10); *B23K 26/36* (2013.01); *B23K 2101/006* (2018.08)

(58) Field of Classification Search
CPC . H02K 7/04; H02K 5/24; G01M 1/16; G01M 1/32; G01M 1/34; B23K 26/21; B23K 26/36; B23K 2101/006
See application file for complete search history.

(56) References Cited

U.S. PATENT DOCUMENTS 3,663,795 A * 5/1972 Myer ................. B23K 26/0823
219/121.81
3,755,646 A   8/1973 Muller
(Continued)

FOREIGN PATENT DOCUMENTS

CN   101435733 A   5/2009
CN   104011609 A   8/2014
(Continued)

*Primary Examiner* — Forrest M Phillips
(74) *Attorney, Agent, or Firm* — Laurence A. Greenberg; Werner H. Stemer; Ralph E. Locher

(57) ABSTRACT

A method dynamically balances a rotational body. First, the rotational body is set into rotation and then an imbalance of the rotational body is determined. According to the determined imbalance, material of the rotational body is removed and/or additional material is applied to the rotational body. The removal and/or the application is carried out by a laser beam of a laser.

7 Claims, 2 Drawing Sheets

(51) Int. Cl.
*G01M 1/32* (2006.01)
*G01M 1/34* (2006.01)
*H02K 5/24* (2006.01)

(56) References Cited

U.S. PATENT DOCUMENTS

| | | | | |
|---|---|---|---|---|
| 4,474,076 | A * | 10/1984 | Lehmann | G01M 1/36 |
| | | | | 73/458 |
| 5,149,936 | A * | 9/1992 | Walton, II | B23K 35/0261 |
| | | | | 219/121.65 |
| 6,606,922 | B2 * | 8/2003 | Case | F16F 15/366 |
| | | | | 700/279 |
| 7,267,029 | B2 * | 9/2007 | Altieri | G01M 1/36 |
| | | | | 700/279 |
| 9,310,774 | B2 | 4/2016 | Conus et al. | |
| 2002/0048009 | A1 * | 4/2002 | Kwan | G03F 7/70766 |
| | | | | 355/72 |
| 2007/0095231 | A1 | 5/2007 | Van Denend | |
| 2015/0026965 | A1 * | 1/2015 | Neumann | F03D 1/065 |
| | | | | 29/598 |
| 2016/0305843 | A1 | 10/2016 | Nomura et al. | |
| 2018/0051771 | A1 | 2/2018 | Nijakowski | |

FOREIGN PATENT DOCUMENTS

| | | | |
|---|---|---|---|
| CN | 106052960 A | 10/2016 | |
| CN | 205879447 U | 1/2017 | |
| CN | 108080786 A | 5/2018 | |
| DE | 2032893 A1 | 1/1972 | |
| DE | 102004037608 A1 | 3/2006 | |
| DE | 102008053838 A1 | 6/2010 | |
| DE | 202018102032 U1 | 5/2018 | |
| EP | 3139044 A1 | 3/2017 | |
| JP | H08163814 A | 6/1996 | |
| WO | 2007006356 A1 | 1/2007 | |
| WO | WO-2012013410 A1 * | 2/2012 | G01M 1/32 |

* cited by examiner

METHOD AND DEVICE FOR DYNAMICALLY BALANCING A ROTATIONAL BODY OR A MOTOR HOUSING

CROSS-REFERENCE TO RELATED APPLICATION

This application is a continuation, under 35 U.S.C. § 120, of copending International Patent Application PCT/EP2020/064619, filed May 27, 2020, which designated the United States; this application also claims the priority, under 35 U.S.C. § 119, of German Patent Application DE 10 2019 207 940.7, filed May 29, 2019; the prior applications are herewith incorporated by reference in their entirety.

FIELD AND BACKGROUND OF THE INVENTION

The invention relates to a method for dynamically balancing a rotational body, in particular a motor housing of an electric motor. The invention also relates to a device for dynamically balancing a rotational body, and to an electric motor with a rotational body which has been balanced by the method as well as to a use of the method for dynamically balancing a motor housing with a magnet element fitted therein.

Rotating or rotationally symmetrical components as rotational bodies always have at least a certain imbalance as a result of production-related or design-related tolerances. An imbalance is intended to be understood here as meaning in particular an unsymmetrical mass distribution of the (rotationally symmetrical) rotational body, whereby its axis of rotation does not coincide with its principal axes of inertia. During rotation of the rotational body, the imbalance causes so-called imbalance forces to occur as centrifugal forces, which increase with increasing rotational speed, and bring about an unround, egg-shaped elliptical rotational movement of the rotational body. As a result, vibrations and noise emissions that are undesired in operation occur as a result of the imbalance of the rotational body.

Due to the imbalance, the lifetime of a product having the component or the rotational body and/or the lifetime of bearings rotatably mounting the rotational body may be reduced. Furthermore, at high rotational speeds there is in particular the risk of the component and/or the bearings being damaged or destroyed completely.

In particular in the case of electric motors of a motor vehicle, which are arranged for example in the region of a passenger compartment, operation with noise reduced as much as possible is desired. Furthermore, such electric motors are intended to be as compact as possible in terms of installation space, that is to say have an overall (installed) size that is as small as possible. Such electric motors therefore require rotationally symmetrical components, such as for example rotors or motor housings, which have the least possible imbalance.

For the elimination or correction of imbalances, it is possible to balance the rotational body or the component. In balancing, the unsymmetrical mass distribution of the rotational body is corrected or compensated. This takes place for example by attaching or applying an additional mass, or by removing a mass of the rotational body, for example by means of machining processes. As a result, mechanical forces act on the rotational body in the course of the balancing.

In balancing, a distinction is made between dynamic balancing and static balancing. In the case of static balancing, only a static component of the imbalance is compensated, that is to say the balancing takes place in one plane. In the case of dynamic balancing, both the static imbalance component and a dynamic (torque) imbalance component are compensated. In this process, both a radial position and an axial position of the imbalance on the rotational body are noted and compensated. The balancing therefore takes place in two planes of the rotational body. The dynamic balancing consequently has the effect of preventing, or at least significantly reducing, an egg-shaped elliptical, unround rotational movement.

In particular when there are comparatively high requirements for low noise and the lifetime of electric motors that are compact in terms of installation space, problems occur in conventional balancing processes. Generally, the imbalance of the rotational body or component is determined before and after the balancing by means of an imbalance measuring device, and, in dependence on this, material or mass is applied to or removed from the rotational body. The balancing and the measuring of the imbalance often take place in separate devices, disadvantageously making it more difficult for there to be a uniform production flow in the manufacture of the electric motor or of the component.

SUMMARY OF THE INVENTION

The invention is based on the object of providing a particularly suitable method for dynamically balancing a rotational body. The invention is also based on the object of providing a particularly suitable device for carrying out the method. The invention is also based on the object of providing a particularly suitable electric motor with a rotational body which has been balanced by such a method as well as a particularly suitable use of such a method for dynamically balancing a motor housing with a magnet element fitted therein.

With regard to the method, the object is achieved according to the invention by the features of the independent method claim and with regard to the device by the features of the independent device claim as well as with regard to the electric motor by the features of the independent electrical motor claim and with regard to the use by the features of the independent use claim. Advantageous designs and developments are the subject of the respective subclaims. The advantages and designs presented with regard to the method can also be transferred analogously to the device and/or the electric motor and/or the use, and vice versa.

The method according to the invention is suitable and designed for dynamically balancing a rotational body, that is to say a rotationally symmetrical component or workpiece. The rotational body is for example a component of an electric motor, in particular a rotor or a motor housing.

According to the method, the rotational body is set in rotation and its imbalance is subsequently determined. In dependence on the determined imbalance, material of the rotational body is removed and/or additional material is applied to the rotational body. In dependence on the detected or determined imbalance, an imbalance compensation or an imbalance correction is performed for reducing the imbalance, that is to say for reducing an unsymmetrical mass distribution of the rotational body. The conjunction "and/or" is intended to be understood here and hereinafter such that the features linked by means of this conjunction can be formed both together and as alternatives to one another.

The imbalance compensation or the imbalance correction, that is to say the removal and/or application of material from (to) the rotational body, is carried out here by means of a laser beam of a laser. As a result, a particularly suitable method for balancing a rotational body is realized.

Particularly accurate or precise balancing of the rotational body is made possible by the laser or the laser beam. As a result, even small imbalances can be reliably eliminated. Consequently, particularly high balancing quality of the rotational body can be realized by the laser. Furthermore, in the case of such laser balancing, no additional mechanical forces act on the rotational body.

The removal therefore takes place in particular by means of a (subtractive, negative) laser removal, while the application takes place in particular by means of an (additive, positive) laser application or laser build-up welding (laser metal deposition, LMD). During the application, the additional material is for example fed in the form of a wire or metal powder and applied to the rotational body layer by layer, and by means of the laser beam is joined or fused to the material of the rotational body in a material-bonding manner without any pores or cracks.

The method according to the invention is intended in particular for fine balancing of the rotational body, that is to say the correction or compensation of comparatively small imbalances or comparatively small unsymmetrical mass distributions. In the case of greater imbalances, it is possible here in particular that a two-stage balancing method is provided, in which, in a rough method step, the imbalance is for example reduced by means of machining processes and in which, in a then-following second, finer method step, the method according to the invention is used.

In an advantageous embodiment, the removal and/or the application is/are carried out during the rotation of the rotational body. In particular, the removal and/or the application is/are carried out here for example during the determination of the imbalance. The dynamic balancing of the rotational body therefore takes place substantially at the same time as the measuring or determining of the imbalance. This means that the rotational body is for example measured and balanced at the same time. As a result, an integrated controlled process can be realized.

In one possible embodiment, the removal takes place in particular during a rotation of the rotational body at a rated speed. The comparatively high-speed rotation of the rotational body during the removal has the effect that a particularly low input of energy or heat acts on the component or the rotational body, so that substantially no distortion of the rotational body occurs during the removal.

The application takes place in particular during rotation of the rotational body at a rotational speed that is substantially lower than the rated speed during the application. The rotational speed during the removal is for example between greater than 0% (standstill) and 10% of the rated speed, in particular between greater than 0% and 5% of the rated speed, preferably between greater than 0% and 2% of the rated speed. The application or the positive balancing therefore does not take place with the rotational body at a standstill, but with a slow rotation, reduced in comparison with the rated speed.

The imbalance compensation or imbalance correction therefore takes place while the rotational body is being rotated. The balancing is consequently carried out "on-the-fly", whereby particularly uniform production and manufacture of the rotational body is made possible.

In an expedient design of the method, the additional material is applied in the form of lines or strips. As a result, application of the additional material that is particularly effective and expedient with regard to the input of heat into the rotational body is realized.

In a suitable development, during the removal and/or application, the laser beam is moved over the outer circumference of the rotational body by means of a deflecting element. Here, the deflecting element is suitably a laser diverter or a mirror. As a result, the efficiency of the method is significantly improved, since the laser beam is not just arranged at one point of the rotational body but can be moved substantially over its complete outer circumference, in particular with simultaneous rotation of the rotational body. This means that the laser beam is moved by means of the deflecting element in particular along an axial direction of the rotational body, while, as a result of the rotation of the rotational body, the laser beam is effectively moved along its tangential or circumferential direction.

In an alternative form of development, it is for example conceivable that the laser beam or the laser itself is moved over the outer circumference of the rotational body by means of a scanner.

An additional or further aspect of the invention provides that a balancing mass is fastened on an outer circumference of the rotational body, the removal and/or application by means of the laser beam taking place only on the balancing mass. As a result, the input of energy and/or heat to the rotational body itself is reduced. Such a separate balancing mass is advantageous in particular in the case of rotational bodies with which heating of the material of the rotational body in the region of the laser beam has disadvantageous effects.

For the purpose of reliable and permanent fastening, the balancing mass is in particular joined to the outer circumference of the rotational body in a material-bonding manner by means of welding. As a result, operationally reliable fastening of the balancing mass is ensured, even at high rotational speeds of the rotational body.

A "material bond" or a "material-bonding connection" between at least two parts that are connected to one another is understood here and hereinafter as meaning in particular that the parts connected to one another are held together at their contact surfaces by material unification or crosslinking (for example, as a result of atomic or molecular bonding forces), possibly under the effect of an additive.

In a preferred design, in particular a balancing mass of which the inner radius is made smaller than an outer radius of the outer circumference is fastened here. This means that the balancing mass has an approximately arc-shaped cross-sectional form, the balancing mass only lying against the outer circumference of the rotational body in the region of the free ends of the arms of the arc. Consequently, a clearance, that is to say a clear distance, is formed in the region of an apex point of the balancing mass between the rotational body and the balancing mass. This clearance or distance acts as thermal insulation between the balancing mass and the rotational body. As a result, thermal decoupling between the balancing mass and the rotational body is realized, whereby the input of energy and heat in the course of the removal and/or application to the rotational body is further reduced.

The device according to the invention is suitable and designed for dynamically balancing a rotational body. The device has here an imbalance measuring device for determining an imbalance of the rotational body. The device also has a laser for generating a laser beam, by means of which material of the rotational body can be removed and/or additional material can be applied to the rotational body. The imbalance measuring device and the laser are coupled to a controller, that is to say a control unit.

The controller is configured here generally—in terms of programming and/or circuitry—for carrying out the method according to the invention described above. The controller is consequently specifically configured to determine the imbalance of the rotational body, that is to say the position of the unsymmetrical mass distribution, on the basis of imbalance data of the imbalance measuring device, and to calculate a required imbalance compensation or an imbalance correction, as well as to reduce the imbalance by activating the laser.

In a preferred form of design, the controller is formed at least in essence by a microcontroller with a processor and a data memory, in which the functionality for carrying out the method according to the invention is implemented in terms of programming in the form of operating software (firmware), so that, when the operating software is run in the microcontroller, the method is carried out automatically—possibly in interaction with a device user. Within the scope of the invention, the controller may however alternatively also be formed by a non-programmable electronic component, such as for example an application-specific integrated circuit (ASIC), in which the functionality for carrying out the method according to the invention is implemented by circuitry-based means.

The imbalance measuring device has here for example a mount for the rotational body, and rotates the latter during operation, the imbalance forces occurring being detected by means of force sensors. The controller determines or calculates from the recorded force signals the imbalance of the rotating rotational body as well as the necessary imbalance compensation. Substantially at the same time, the laser beam is radiated in a continuous or pulsed manner onto the, in particular rotating, rotational body in order to realize or implement the imbalance compensation.

The laser is configured for example as a continuously operating fiber laser with a laser output of for example 12 kW (kilowatts), the wavelength having been adapted in particular to the material to be removed or to be applied of the rotational body or the additional material. For example, in the case of a carbon steel, in particular a fiber laser with a wavelength of approximately 1060 nm (nanometers) is used.

In the course of the application or removal, the laser beam is in particular radiated here onto the rotational body or the additional material in a pulsed manner, that is to say in the form of pulses. Provided here for example are pulse lengths or pulse durations of individual pulses of the laser that are preferably less than 100 μs (microseconds). Multiple individual pulses may be generated one after the other as a pulse packet or as a pulse sequence for the removal or application, for example with a pulse packet duration of up to 10 ms (milliseconds). Here, the laser is expediently synchronized with the imbalance measuring device.

The electric motor according to the invention is intended for a motor vehicle, and has a rotational body which has been dynamically balanced by the method described above. Here, the rotational body is for example a motor housing, in particular a pole pot, with a magnet element fitted therein, in particular a motor ring magnet. The electric motor is formed here for example as an external rotor for an electromotive adjusting drive of the motor vehicle, for example for a radiator fan or for a window lifter, the motor housing with the motor ring magnet being configured in particular as a rotor of the electric motor.

Here, the magnet element is comparatively temperature-sensitive, since for example demagnetizing effects may occur at temperatures above 120° C. A particularly low input of heat to the motor housing and the magnet element is ensured by the method according to the invention, as a result of which the rotational body has been dynamically balanced in a simple and reliable way. As a result, particularly uniform production and manufacture of the rotational body, and consequently of the electric motor, is made possible.

In a preferred application, the method described above is consequently used in particular for dynamically balancing a motor housing with a magnet element fitted therein.

Other features which are considered as characteristic for the invention are set forth in the appended claims.

Although the invention is illustrated and described herein as embodied in a method for dynamically balancing a rotational body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and variables are always provided with the same reference signs throughout the figures.

Figure 1:
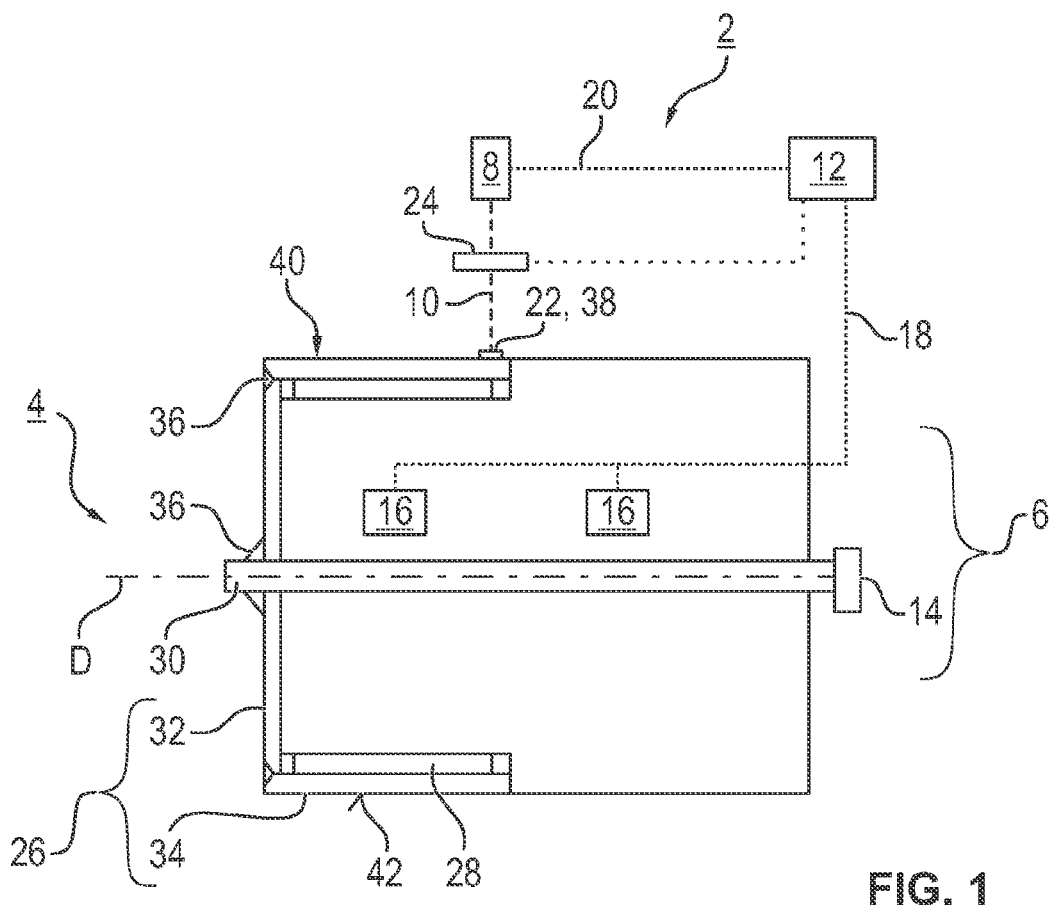
FIG. 1 is a diagrammatic, partial sectional view of a device for dynamically balancing a motor housing as a rotational body.

Referring now to the figures of the drawings in detail and first, particularly to FIG. 1 thereof, there is shown a device 2 for dynamically balancing a rotational body 4 is shown in a schematic and simplified representation. The device 2 has here an imbalance measuring device 6 for determining an imbalance of the rotational body 4. The device 2 also has a laser 8 for generating a laser beam 10, by means of which, in dependence on the determined imbalance, material of the rotational body 4 is removed and/or additional material is applied to the rotational body 4. The imbalance measuring device 6 and the laser 8 are coupled in signaling terms to a controller 12, that is to say a control unit.

Preferably, the rotational body 4 is mounted on both sides, at each of its end faces, in a bearing 14 of the imbalance measuring device 6 rotatably along its longitudinal axis, with only one bearing 14 being shown in FIG. 1 by way of example.

The imbalance measuring device 6 has at least one imbalance sensor 16, which detects the imbalance of the rotating rotational body 4 occurring, for example by force and/or displacement measurement. In FIG. 1, two imbalance sensors 16 are shown by way of example.

The at least one imbalance sensor 16 sends the recorded data as imbalance signals 18 to the controller 12, which as a consequence determines or calculates the imbalance of the rotating rotational body 4 as well as the necessary imbalance compensation or the necessary imbalance correction. The controller 12 determines here in particular the position of the unsymmetrical mass distribution. Subsequently, the laser 8 or the laser beam 10 is radiated in a continuous or pulsed manner onto the rotating rotational body 4 by means of a laser signal 20, in order to realize or implement the imbalance compensation. Here, depending on the necessary imbalance compensation, either material of the rotational body 4 is removed by means of subtractive laser removal or additional material 22 is applied or added by means of laser application or laser metal deposition (LMD) in order to reduce the unsymmetrical mass distribution of the rotational body 4.

During the removal and/or application, the laser beam 10 is moved over the outer circumference of the rotational body 4 by means of a deflecting element 24 coupled to the controller 12. The deflecting element 24 is suitably formed as a laser diverter or a mirror. By means of the deflecting element 24, the laser beam 10 is moved along an axial direction of the rotational body 4, while, as a result of the rotation of the rotational body 4, at the same time the laser beam 10 is effectively moved along its tangential or circumferential direction. This means that the application and/or removal takes/take place in particular in the radial and/or axial direction of the rotational body 4.

"Axial" or an "axial direction" is understood here and hereinafter as meaning in particular a direction parallel (coaxial) to the axis of rotation D of the rotational body 4. Correspondingly, "radial" or a "radial direction", is understood here and hereinafter as meaning in particular a direction oriented perpendicularly (transversely) to the axis of rotation D along the rotational body 4. "Tangential" or a "tangential direction" is understood here and hereinafter as meaning in particular a direction along the circumference of the rotational body 4 (circumferential direction, azimuthal direction), that is to say a direction perpendicular to the axial direction and to the radial direction.

The laser 8 is configured for example as a continuously operating fiber laser with a laser output of 12 kW and with a wavelength of approximately 1060 nm. In the course of the application or removal, the laser beam 10 is in particular radiated here onto the rotational body 4 in a pulsed manner, that is to say in the form of pulses. Provided here for example are pulse lengths or pulse durations between 0.1 and 10 ms (milliseconds). The application and/or removal by means of the laser beam 10 takes/take place here in particular in the form of lines along the circumferential or tangential direction of the rotational body 4. Here, the laser 8 is synchronized in particular with the rotation of the rotational body 4 controlled rotation by the imbalance measuring device 6.

The removal and/or the application is/are therefore carried out by means of the device 2 during the rotation of the rotational body 4. In particular, the removal and/or the application is/are carried out here during the determination of the imbalance. The dynamic balancing of the rotational body 4 therefore takes place for example at the same time as the measuring or determining of the imbalance. The imbalance compensation or the imbalance correction therefore consequently takes place "on-the-fly".

In the exemplary embodiments shown of FIGS. 1 to 4, the rotational body 4 is formed in particular as a rotationally symmetrical component of an electric motor, not shown any more specifically, of a motor vehicle. The rotational body 4 is configured in particular as a motor housing 26, in particular as a pole pot, with a magnet element 28 fitted therein, in particular a (motor) ring magnet, and with a motor shaft 30. The rotational body 4 is consequently formed in particular as a rotor of an electric motor configured as an external rotor.

Figure 2:
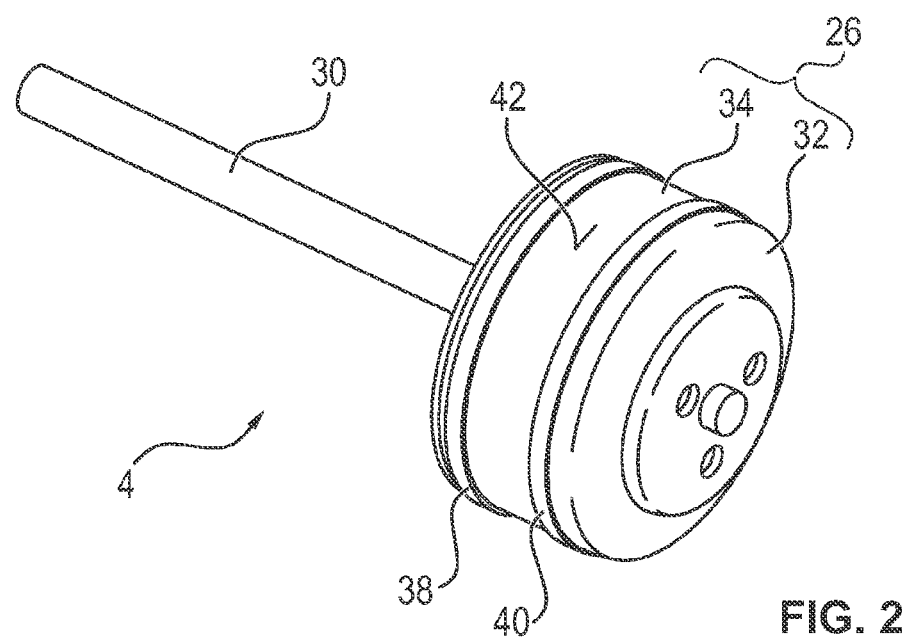
FIG. 2 is a perspective view of the motor housing with a shaft.
Figure 3:
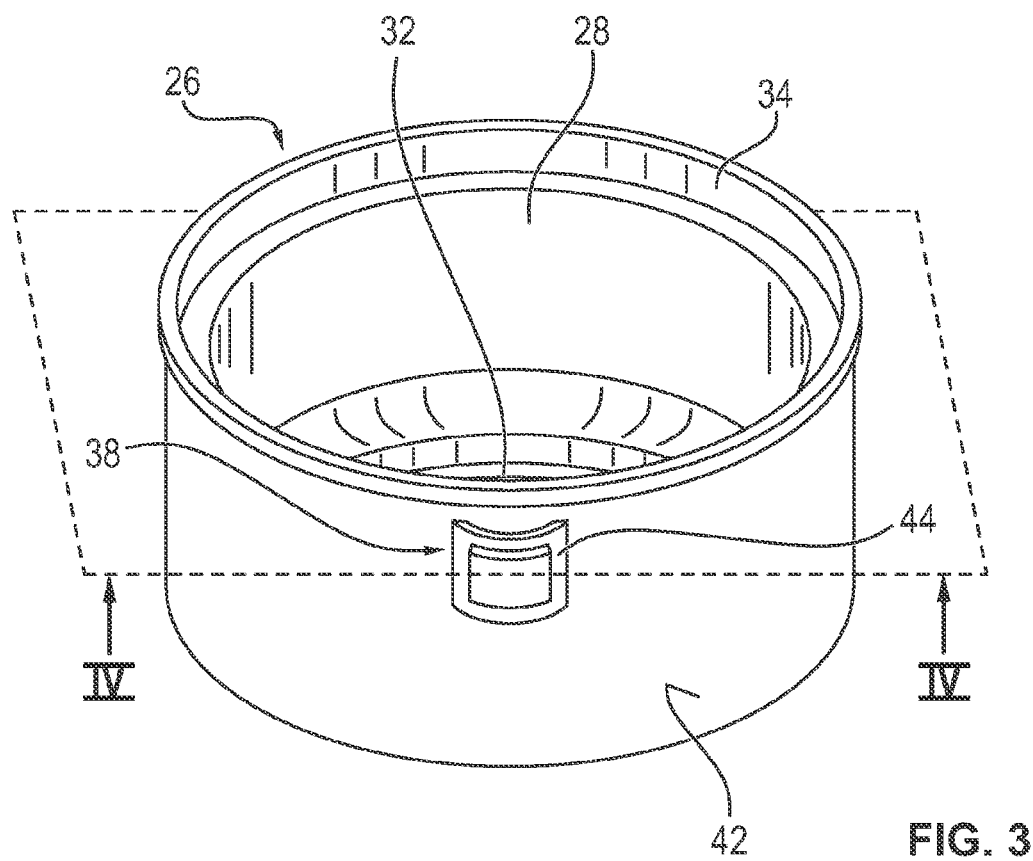
FIG. 3 is a perspective view of the motor housing with a balancing mass.
Figure 4:
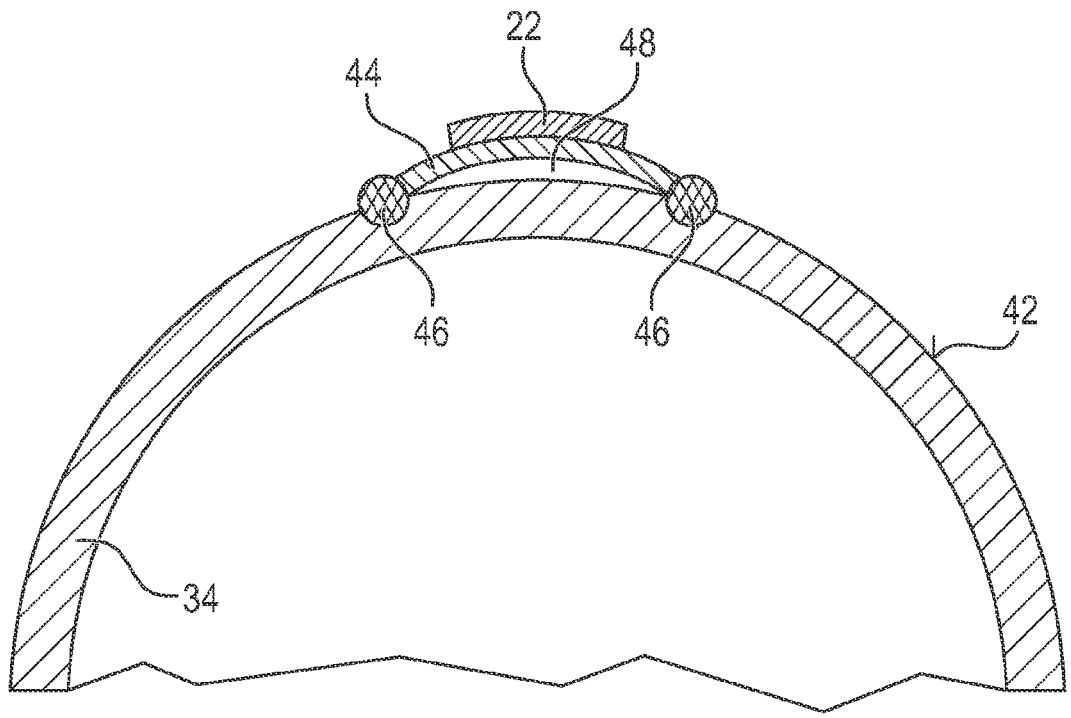
FIG. 4 is a partial sectional view of the motor housing with the balancing mass along the line IV-IV shown in FIG. 3.

The bell-shaped or pot-shaped motor housing 26 represented in FIGS. 2 to 4 has a stamped metal part in the form of a bearing shield 32 as a housing base, and a metal, in particular hollow-cylindrical or tubular, annular wall 34 as a housing casing or housing wall. The motor shaft 30 has here for example a diameter of between 2 and 10 mm (millimeters), and is made of a burnished steel. The bearing shield 32 and the annular wall 34 as well as the motor shaft 30 are joined to one another by means of material-bonding connections 36. The annular or hollow-cylindrical or tubular magnet element 28 is arranged on the inner circumference of the annular wall 34.

The application and/or removal for imbalance correction preferably takes/take place here in two imbalance or compensation regions 38 and 40 on an outer circumference 42 of the motor housing 26. The approximately ring-shaped or band-shaped imbalance regions 38 and 40 are arranged axially spaced apart from one another on the annular wall 34, the imbalance region 38 being arranged at the end remote from the bearing shield 32, and the imbalance region 40 being arranged at the end toward the bearing shield 32 of the annular wall 34.

The magnet element 28 has for example a maximum permissible temperature of approximately 120° C. In order to avoid this temperature of the magnet being undesirably exceeded, in particular in the course of a radial application of additional material 22, it is provided in the exemplary embodiment shown in FIG. 3 and FIG. 4 that an additional or balancing mass 44, on which the application takes place, is arranged on the outer circumference 42. As a result, the input of energy and heat to the annular wall 34, and consequently to the magnet element 28, is reduced.

The balancing mass 44 is suitably arranged here in one of the imbalance regions 38, 40, the balancing mass 44 in the exemplary embodiment of FIG. 3 and FIG. 4 being arranged in particular in the region 38. With suitable dimensioning, the balancing mass 44 has for example a mass of between 5 to 20 mg (milligrams) and 100 to 300 mg.

As can be seen in particular in the schematic part sectional view of FIG. 4, the balancing mass 44 is in particular joined to the outer circumference 42 of the motor housing 26 in a material-bonding manner by means of two welded points 46. The balancing mass 44 has here an inner radius which is made smaller than an outer radius of the outer circumference 42. The difference in radius between the inner radius of the balancing mass 44 and the outer radius of the outer circumference 42 is for example less than or equal to 1 mm.

The difference in radius has the effect that the balancing mass 44 has an approximately arc-shaped or convex cross-sectional form, the welded points 46 being arranged in the region of the free ends of the arms of the arc. Consequently, a radial clearance 48, that is to say a clear distance along the radial direction, is formed or left in the region of an apex point of the balancing mass 44 between the annular wall 34 and the balancing mass 44. This clearance 48 acts as thermal insulation between the balancing mass 44 and the annular wall 34 or the magnet element 28. As a result, thermal decoupling between the balancing mass 28 and the rotational body 4 is realized, whereby the input of energy and heat in the course of the removal and/or application to the rotational body 4 is reduced.

The annular wall 34 and the bearing shield 32 as well as the balancing mass 28 are for example made of steel, in particular high-grade steel or carbon steel.

The claimed invention is not restricted to the exemplary embodiments described above. Rather, other variants of the invention can also be deduced by a person skilled in the art therefrom within the scope of the disclosed claims without departing from the subject matter of the claimed invention. In particular, furthermore, all of the individual features described in connection with the various exemplary embodiments can also be combined with one another in some other way within the scope of the disclosed claims without departing from the subject matter of the claimed invention.

The following is a summary list of reference numerals and the corresponding structure used in the above description of the invention:

2 Device
4 Rotational body
6 Imbalance measuring device
8 Laser
10 Laser beam
12 Controller
14 Bearing
16 Imbalance sensor
18 Force signal
20 Laser signal
22 Additional material
24 Deflecting element
26 Motor housing
28 Magnet element
30 Motor shaft
32 Bearing shield
34 Annular wall
36 Connection
38 Imbalance region
40 Imbalance region
42 Outer circumference
44 Balancing mass
46 Welded point
48 Clearance
D Axis of rotation

The invention claimed is:

1. A method for dynamically balancing a rotational body, which comprises the steps of:
   fastening an arc-shaped balancing mass material-lockingly in a region of free ends of arms of an arc of the arc-shaped balancing mass with, in each case, a welded point by means of welding, on an outer circumference of the rotational body, wherein the arc-shape balancing mass has an inner circumference which is smaller than an outer radius of the outer circumference, so that a free space is formed as thermal insulation between the arc-shaped balancing mass and the rotational body by a difference in radius in an area of an apex point of the arc-shaped balancing mass;
   setting the rotational body in rotation;
   determining an imbalance of the rotational body;
   removing material from the arc-shaped balancing mass and/or applying additional material to the arc-shaped balancing mass in dependence on a determined imbalance; and
   carrying out a material removal and/or a material application by means of a laser beam of a laser.

2. The method according to claim 1, which further comprises carrying out the material removal and/or the material application out during a rotation of the rotational body.

3. The method according to claim 1, which further comprises applying the additional material in a form of lines.

4. The method according to claim 1, wherein during the material removal and/or the material application, moving the laser beam over the outer circumference of the rotational body by means of a deflecting element.

5. A device for dynamically balancing a rotational body, the device comprising:
   an arc-shaped balancing mass having an inner radius, which is smaller than an outer radius of an outer circumference of the rotational body, said arc-shaped balancing mass having arms of an arc with free ends;
   a welding unit for welding said arc-shaped balancing mass material-lockingly in a region of said free ends of said arms of said arc at the outer circumference, so that a free space is formed as thermal insulation between said arc-shaped balancing mass and the rotational body by a difference in radius in an area of an apex point of said arc-shaped balancing mass;
   an imbalance measuring device for determining an imbalance of the rotational body;
   a laser for generating a laser beam, by means of said laser material of said arc-shaped balancing mass can be removed and/or additional material can be applied to said arc-shaped balancing mass;
   a controller programmed to:
      set the rotational body in rotation;
      determine the imbalance of the rotational body via said imbalance measuring device;
      remove the material from said arc-shaped balancing mass and/or apply the additional material to said arc-shaped balancing mass in dependence on a determined imbalance; and
      carry out a material removal and/or a material application by means of the laser beam of the laser.

6. An electric motor for a motor vehicle, comprising:
   a rotational body being dynamically balanced by the method according to claim 1.

7. A method for dynamically balancing a rotational body being a motor housing with a magnet element fitted therein, which comprises the steps of:
   fastening an arc-shaped balancing mass material-lockingly in a region of free ends of arms of an arc of the arc-shaped balancing mass with, in each case, a welded point by means of welding, on an outer circumference of the motor housing, wherein the arc-shape balancing mass has an inner circumference which is smaller than an outer radius of the outer circumference, so that a free space is formed as thermal insulation between the arc-shaped balancing mass and the motor housing by a difference in radius in an area of an apex point of the arc-shaped balancing mass;
   setting the motor housing in rotation;
   determining an imbalance of the motor housing;
   removing material from the arc-shaped balancing mass and/or applying additional material to the arc-shaped balancing mass in dependence on a determined imbalance; and
   carrying out a material removal and/or application by means of a laser beam of a laser.

* * * * *

UNITED STATES PATENT AND TRADEMARK OFFICE
CERTIFICATE OF CORRECTION

| | | |
|---|---|---|
| PATENT NO. | : 12,081,101 B2 | Page 1 of 1 |
| APPLICATION NO. | : 17/533780 | |
| DATED | : November 23, 2021 | |
| INVENTOR(S) | : Roland Kalb et al. | |

It is certified that error appears in the above-identified patent and that said Letters Patent is hereby corrected as shown below:

On the Title Page

Item (71) The Applicant should read as follows:
(71) Applicant: Brose Fahrzeugteile SE & Co. Kommanditgesellschaft, Bamberg, Bamberg (DE)

Item (73) The Assignee should read as follows:
(73) Assignee: Brose Fahrzeugteile SE & Co. Kommanditgesellschaft, Bamberg, Bamberg (DE)

Signed and Sealed this
Eighteenth Day of February, 2025

Coke Morgan Stewart
*Acting Director of the United States Patent and Trademark Office*